United States Patent
Kim

(10) Patent No.: US 6,697,434 B1
(45) Date of Patent: Feb. 24, 2004

(54) METHOD FOR TRACING OPTIMAL PATH USING TRELLIS-BASED ADAPTIVE QUANTIZER

(75) Inventor: Chul Woo Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/487,226

(22) Filed: Jan. 19, 2000

(30) Foreign Application Priority Data

Jan. 20, 1999 (KR) .......................................... 1999-1616

(51) Int. Cl.[7] .............................................. H04B 14/06
(52) U.S. Cl. ........................ 375/245; 375/265; 382/251
(58) Field of Search ....................... 375/240.03, 240.22, 375/243, 245, 262, 265, 341, 246, 240.23, 253; 714/792, 795, 796, 746; 382/245, 246, 248, 251

(56) References Cited

U.S. PATENT DOCUMENTS

| | | | |
|---|---|---|---|
| 5,329,537 A | * 7/1994 | Alard et al. | 714/794 |
| 5,781,569 A | * 7/1998 | Fossorier et al. | 714/796 |
| 5,844,945 A | * 12/1998 | Nam et al. | 375/341 |
| 5,991,341 A | * 11/1999 | Shin | 375/265 |
| 6,118,822 A | * 9/2000 | Bist | 375/240.03 |
| 6,128,346 A | * 10/2000 | Suarez et al. | 375/254 |
| 6,249,546 B1 | * 6/2001 | Bist | 375/240.03 |
| 6,263,312 B1 | * 7/2001 | Kolesnik et al. | 704/500 |

* cited by examiner

Primary Examiner—Jean B. Corrielus
(74) Attorney, Agent, or Firm—Fleshner & Kim LLP

(57) ABSTRACT

A method for tracing an optimal path by employing a Trellis-based adaptive quantizer can accelerate quantization path tracing and simplify computation thereof, by preventing the quantization path tracing after an turning point of distortion in the Trellis-based adaptive quantizer and after an optimal quantization level to non-zero at a branch positioned from a zero node to a non-zero node. The conventional Trellis-based adaptive quantizer selects the optimal path by tracing and examining all the paths, and thus computation is complicated. In addition, a high speed quantization algorithm is difficult to perform. According to the present invention, in a Trellis-based adaptive quantizer of Trellis run length coding and entropy constraining coefficients generated by performing discrete cosine transformation (DCT) on image signals in block units, a method for tracing an optimal path by employing a Trellis-based adaptive quantizer, includes: a step for preventing quantization path tracing of branches after a variation position of distortion, on the basis of arrangement of a quantization period and monotonic increasing of a code word length, in a Trellis structure of generating one stage whenever the coefficients are quantized one by one from a predetermined node; and a step for preventing path tracing after an optimal coding level to non-zero at the branches positioned from zero to non-zero, based on independence of the respective stages, when quantizing non-zero coefficients from the predetermined node.

11 Claims, 9 Drawing Sheets

METHOD FOR TRACING OPTIMAL PATH USING TRELLIS-BASED ADAPTIVE QUANTIZER

BACKGROUND OF THE INVENTION

1. Field of the Invention

The present invention relates to a method for tracing an optimal quantization path using a Trellis-based adaptive quantizer, and in particular to an improved method for tracing an optimal path using a Trellis-based adaptive quantizer which can accelerate quantization path tracing and simplify computation thereof, by excluding the quantization path tracing after an turning point of distortion and after an optimal quantization level to non-zero at a branch directed to the non-zero node from a zero node.

2. Description of the Background Art

In general, a Trellis-based adaptive quantizer codes coefficients to which image blocks are transformed by transformation methods, such as a discrete cosine transformation (DCT) in a Trellis structure, into a run-length code and entropy constrained code.

FIG. 1 is a concept diagram of data quantization using the Trellis-based adaptive quantizer in the conventional art. Whenever predetermined coefficients $C1, C2, \ldots, Ci, \ldots, C64$ from a predetermined node at an initial state are quantized one by one, corresponding stages $S1, S2, \ldots, S64$ are formed. Here, white circles imply code as '0', $Ri$ denotes a run length (which means the number of code as '0'), and black circles imply code of the coefficients $Ci$ to a level (or amplitude) $Li$.

In the above example, when it is presumed that one image block is divided into 8×8, the number of the coded coefficients is 64 thereby. A solid line indicates a branch for coding the coefficient as non-zero from a predetermined node, and a dotted line indicates a branch for coding the coefficient as zero from a predetermined node.

At this time, the respective stages are defined as an algorithm of performing Huffman coding on a predetermined symbol, a run length and a level. Accordingly, paths between the branches connecting the nodes of the respective stages are defined as a metric. The metric J is represented by the following expression.

$$J = D + \lambda \cdot R$$

Here, R denotes the number of bits used for coding the coefficient (for example, R=64), D denotes distortion between the coefficients of each stage and the coded coefficient (or the absolute value of the subtraction between the coefficients of each stage and the coded coefficient), and $\lambda$ denotes Lagrange constant.

When the data is quantized by the expression $J(n)=D(n)+\lambda \cdot R(n)$ in order to obtain a minimum metric $J(n)$ to the n-th stage $S(n)$, the conventional method for tracing the optimal quantization path using the Trellis-based adaptive quantizer adapts only the distortion D, not R(n), computes the metrics for all the paths, selects the metric at the optimal state, and determines the optimal path.

However, the conventional method has a disadvantage in that the optimal path is determined by computing all the metrics in regard to the whole paths or branches. As a result, a system adapted the conventional method codes the data lately and complicatedly, and thereby takes a long time to compute the optimal path tracing.

SUMMARY OF THE INVENTION

Accordingly, it is a primary object of the present invention to provide an improved method for tracing an optimal path using a Trellis-based adaptive quantizer, which can search a quantization interval at a high speed by excluding branches which do not require path tracing in a Trellis structure.

It is another object of the present invention to provide an improved method for tracing an optimal quantization path using a Trellis-based adaptive quantizer which can accelerate quantization path tracing and simplify computation thereof, by excluding the quantization path tracing after a turning point of distortion in the Trellis-based adaptive quantizer and after an optimal quantization level to non-zero at a branch directed to a non-zero node from a zero node.

In order to achieve the above-described objects of the present invention, in a Trellis-based adaptive quantizer codes coefficients to which image blocks are transformed by transformation methods in a Trellis structure into a run-length code and entropy constrained code, a method for tracing an optimal path using the Trellis-based adaptive quantizer comprises, a step for excluding quantization path tracing of branches after a turning point of distortion, on the basis of arrangement of a quantization interval and monotonic increasing characteristics of a code word length, in a Trellis structure of generating one stage whenever the coefficients are quantized one by one from a node, and a step for excluding path tracing after an optimal coding level to non-zero at the branches positioned from zero node to non-zero node, based on independence of the respective stages, when quantizing coefficients to non-zero node from the node.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The present invention relates to a method for estimating an optimal level using a monotonic increasing charateristics of a code length of one dimensional arrangement of a quantization interval and a Huffman table, a method for pruning based on an independence characteristics between stages when coding a coefficient, a method for tracing an optimal path using a Trellis-based adaptive quantizer capable of tracing a quantization optimal path using different pruning methods at a non-zero node.

Here, the monotonic increase means a condition in which the code length is equal or greater than that of the previous code as the level of a variable length code (VLC) is increased with respect to the same run level, and also means a condition in which the code length is equal or greater than that of the previous code as the run length of a VLC is increased with respect to the same level.

The optimal path tracing method according to the present invention will be explained with reference to the accompanying drawings.

1) The optimal level is estimated using a monotonic increase characteristics of one dimensional arrangement of a quantization interval and a code length of a Huffman table, and a path search after a turning point of a distortion is removed for thereby decreasing the amount of a quantization computation.

Figure 1:
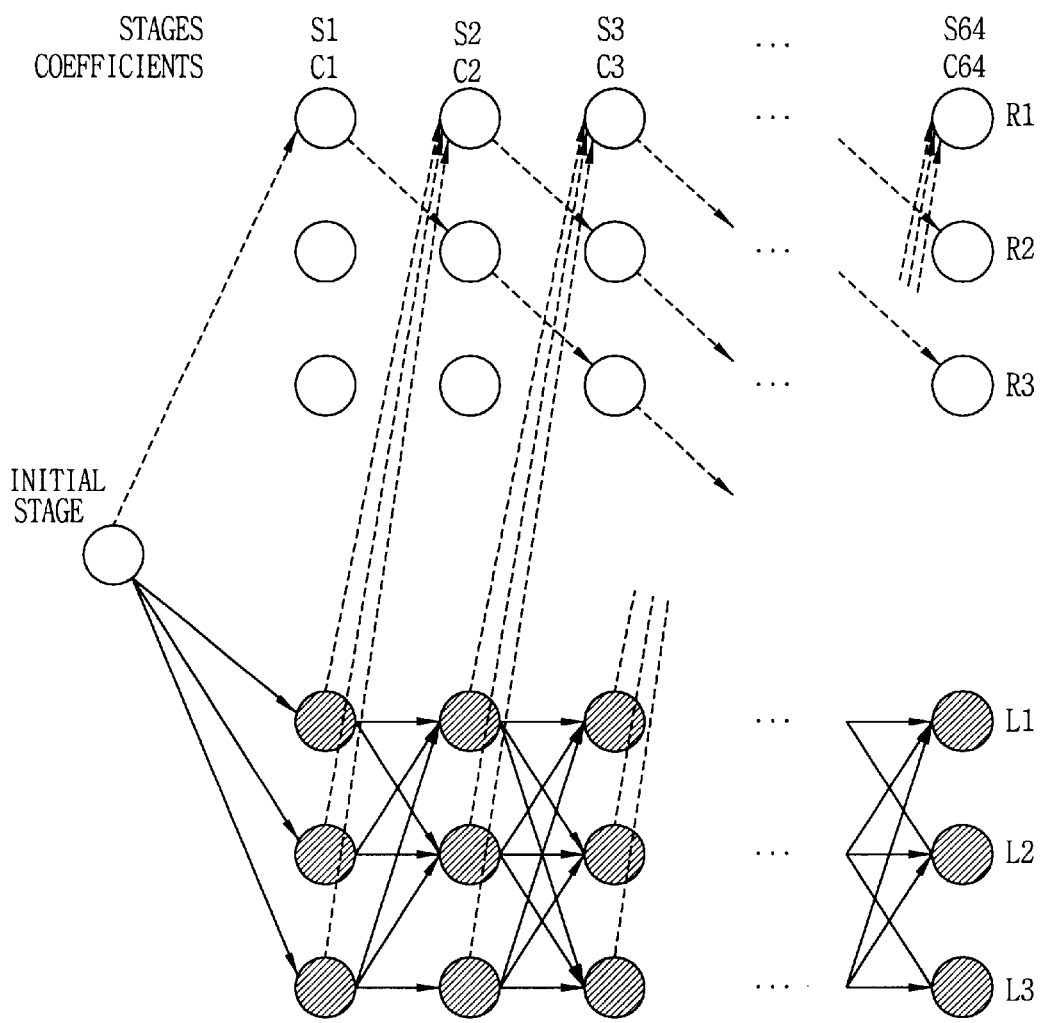
FIG. 1 shows a concept of a conventional method for tracing an optimal path using a Trellis-based adaptive quantizer.
Figure 2:
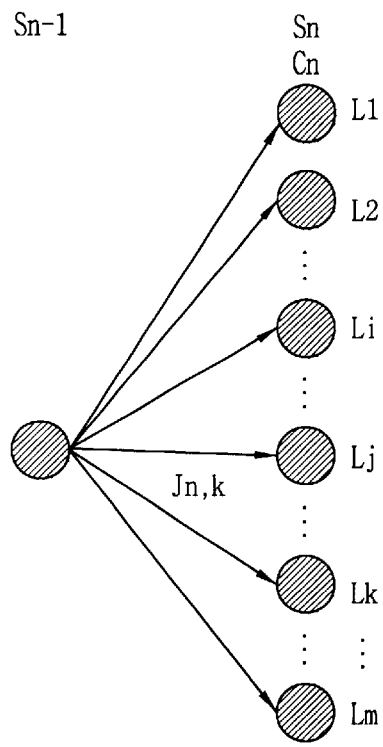
FIG. 2 shows a concept of branching by level increase in accordance with the present invention.

FIG. 2 illustrates a path that a certain coefficient (Cn) is quantized based on a non-zero and pruning operation which are transited from a (n−1)-th stage (Sn−1) to a n-th stage (Sn). Namely, the n-th stage is divided into L1, L2, . . . , Li, . . . , Lj, . . . , Lk, . . . , Lm levels wherein i<j<k<m in the stage of the same. The length of each level is Li<Lj<Lk<Lm.

Assuming that the distortion metric D is $d_{Lm}(ci)$, the distortion metric(D) is a linear distance obtained by coding a coefficient Ci based on the level Lm.

In the case of $d_{Lm}(ci)>d_{Lj}(ci)$, and $d_{Lk}(ci)>d_{Lj}(ci)$, since $m \geq p \geq k$, it is not needed to search the distortion metric D with respect to all nodes of the level below Lp. Namely, since the path trace is performed at a branch in which the coefficient is coded to a non-zero. The pruning operation is not performed with respect to the branches after a turning point in which the distortion is decreased and then increased, and an unnecessary path trace is excluded, so that the pruning operation is performed with respect to the path to the node of level Lp below $p \geq k$ among all branches toward the n-th stage Sn.

Figure 3:
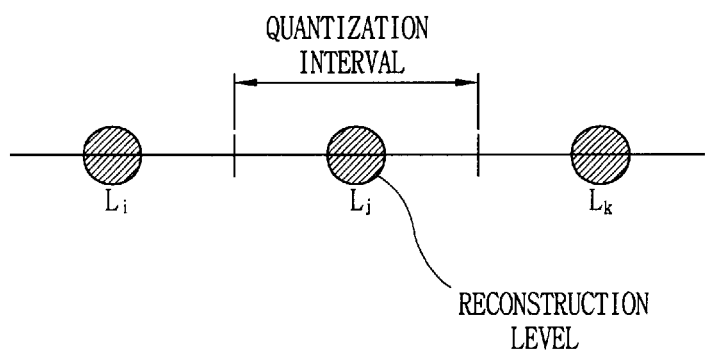
FIG. 3 shows a concept of interval arrangement of a quantization level in accordance with the present invention.

As shown in FIG. 3 which illustrates an interval arrangement of the quantization level, the quantizing level is defined based on one dimension, and the length of the levels is Li<Lj<Lk. Namely, assuming that the metric allocated to the branches transited from the (n−1)-th stage Sn−1 to the level Lk of the n-th stage Sn is $J_{n,k}=D_{n,k}+\lambda \cdot R_{n,k}$, the condition of Rn,i Rn,j Rn,k is satisfied with respect to the run length in which the length of the code of the Huffman table is same.

2) When coding the coefficient, in the pruning operation using an independence charateristics between stages, after the level optimally coded non-zero at the branch from zero node to non-zero node, since the run length and distortion D are increased, the path trace is excluded for thereby decreasing the computation amount of the quantization. Namely, in the case that the coefficients are coded to non-zero at a certain node, the optimal path is obtained by searching the minimum metric J at the current stage even when the coding is performed to zero node at a previous stage between stages or the coding is performed to non-zero node for the reason that in the case that the transition is performed from the non-zero node to the non-zero node, the run length becomes 0, and in the case that the transition is performed from the zero node to the non-zero node, the run length is determined. Namely, the run level becomes the run length. Therefore, the length and distortion of the code needed for coding the data are determined based on the state that the transition is performed at the node, and the optimal path is determined.

Figure 4:
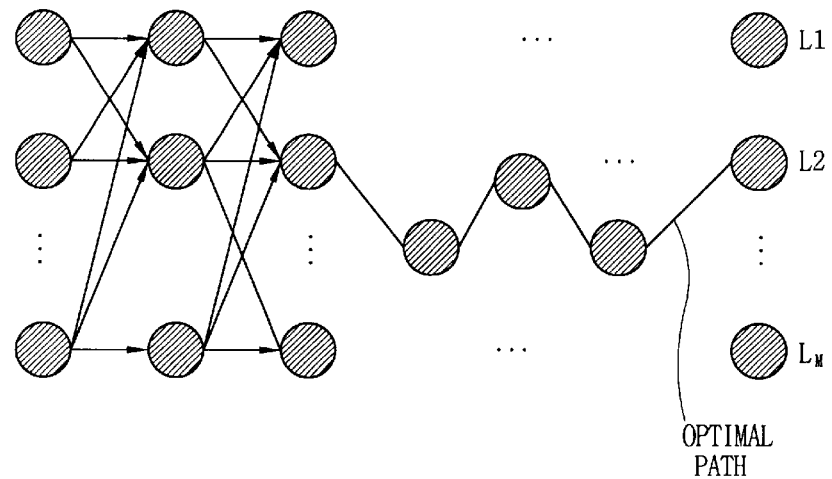
FIG. 4 shows a concept of tracing an optimal path when quantizing to non-zero in accordance with the present invention.

FIG. 4 illustrates an optimal path determined based on the above-described method. The optimal state of the optimal path transited from the non-zero node to the non-zero node is determined at each stage, so that only one path is obtained. Namely, in the case that the coding is performed from the non-zero level to the non-zero level, since the run length and level are determined based on the bit length R and distortion D between stages, the value J is determined.

Therefore, when the transition is performed from one stage to the next stage, in the case that the coding is performed from a certain node to the non-zero node, the optimal coding level is searched using the method (1) among the non-zero nodes, and then the nodes of the metric levels which are the same as or smaller than the last determined nodes at the previous zero nodes for thereby decreasing the computation amount of the quantization.

Figure 5:
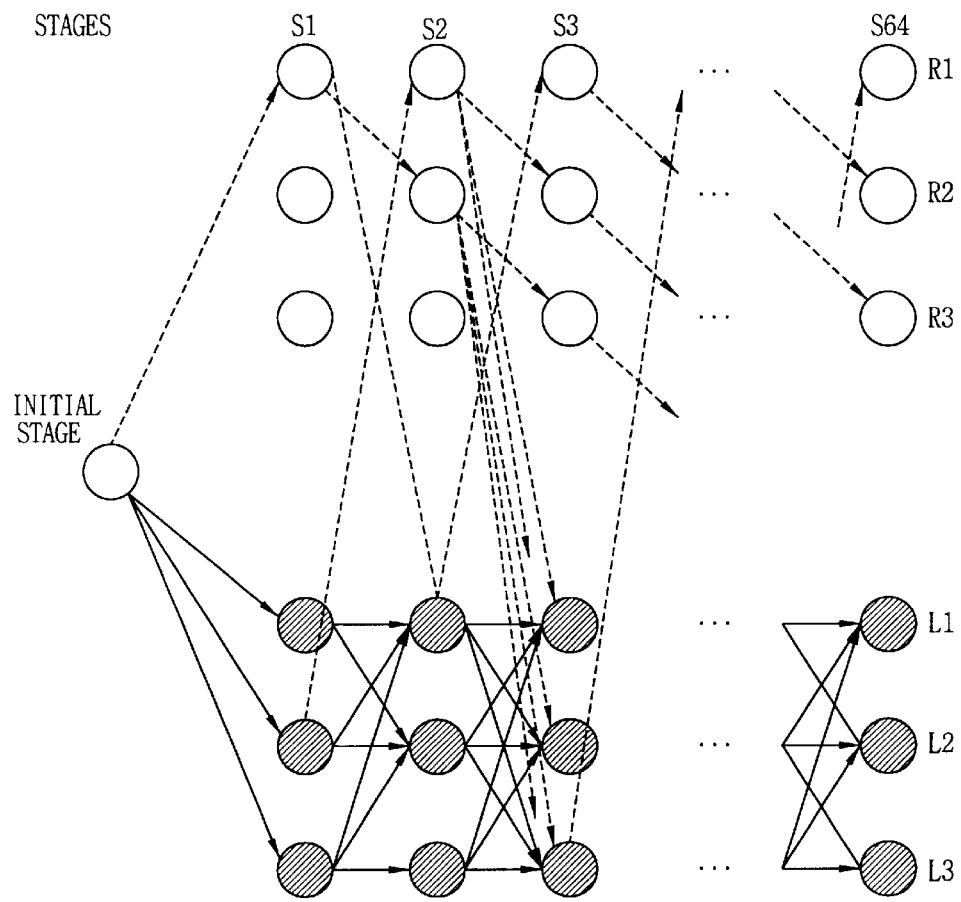
FIG. 5 shows a concept of tracing the optimal path by using a pruning of branches between stages in accordance with the present invention.

Therefore, if the path transited to the nodes in which the quantization is performed from each node of the optimally determined path to the zero and the path transited to the optimal nodes in a state that the coding is made to zero node are stored, it is possible to quickly search the optimal path. Namely, in a step transited from the node of the state code to zero to the node quantized to a non-zero state, when the coding is performed from the n-th stage Sn to the non-zero state and the optimal node is Lk node, the branch transited from each node of the zero run of the (n−1)-th stage to the non-zero node is searched with respect to Li of ik. FIG. 5 illustrates the above-described operation. At this time, the bold solid line is the optimal path.

Figure 6:
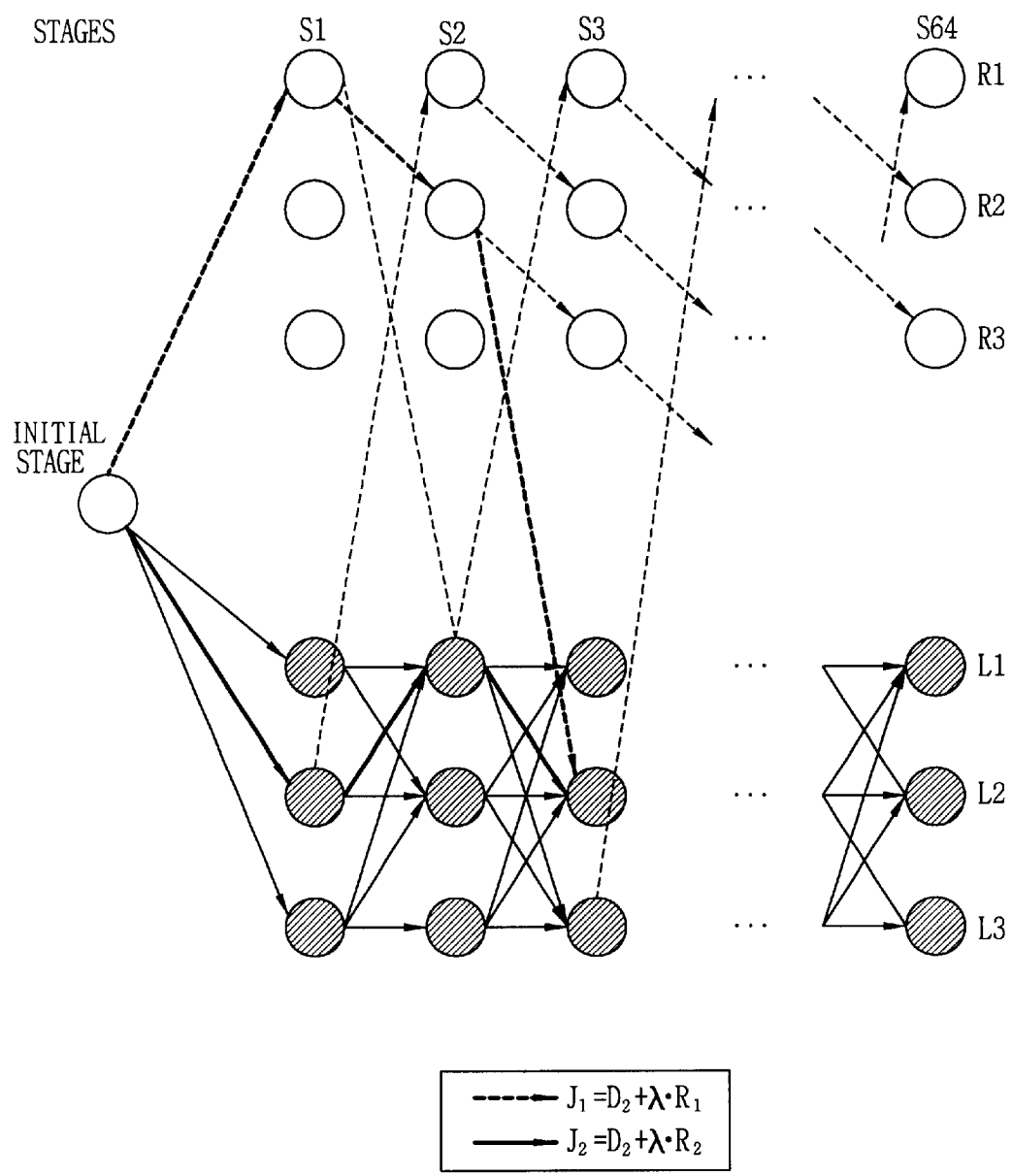
FIG. 6 shows a concept of tracing the optimal path among the paths directed into an node from other nodes in accordance with the present invention.

3) in the pruning method at the non-zero node inputted from different paths, in the case that more than two paths are directed from a certain stage to the non-zero node, the optimal path is stored among the paths gathered at the same node, and the pruning operation is not performed with respect to the remaining nodes. As shown in FIG. 6, even when computing the metric with respect to the branches in the direction of a certain node from the nodes, the previously determined metric is not affected.

Therefore, the optimal path among a plurality of different paths gathered at one node is stored, and the remaining paths are excluded, so that only the memory used for the optimal path trace is used, whereby a large capacity memory is not used. Namely, as shown in FIG. 6, in the case that two different optimal paths (bold solid and dotted lines) are gathered at one node, the above-described paths has values of Ji (J1=D1+λ·R1) and J2(J2=D2+λ·R2). At this time, the path having a smaller metric value of the two paths J1 and J2 is stored, and the remaining path is removed, so that it is possible to implement a high speed quantization speed of the path trace and decrease the memory for storing the metric of the path.

Figure 7:
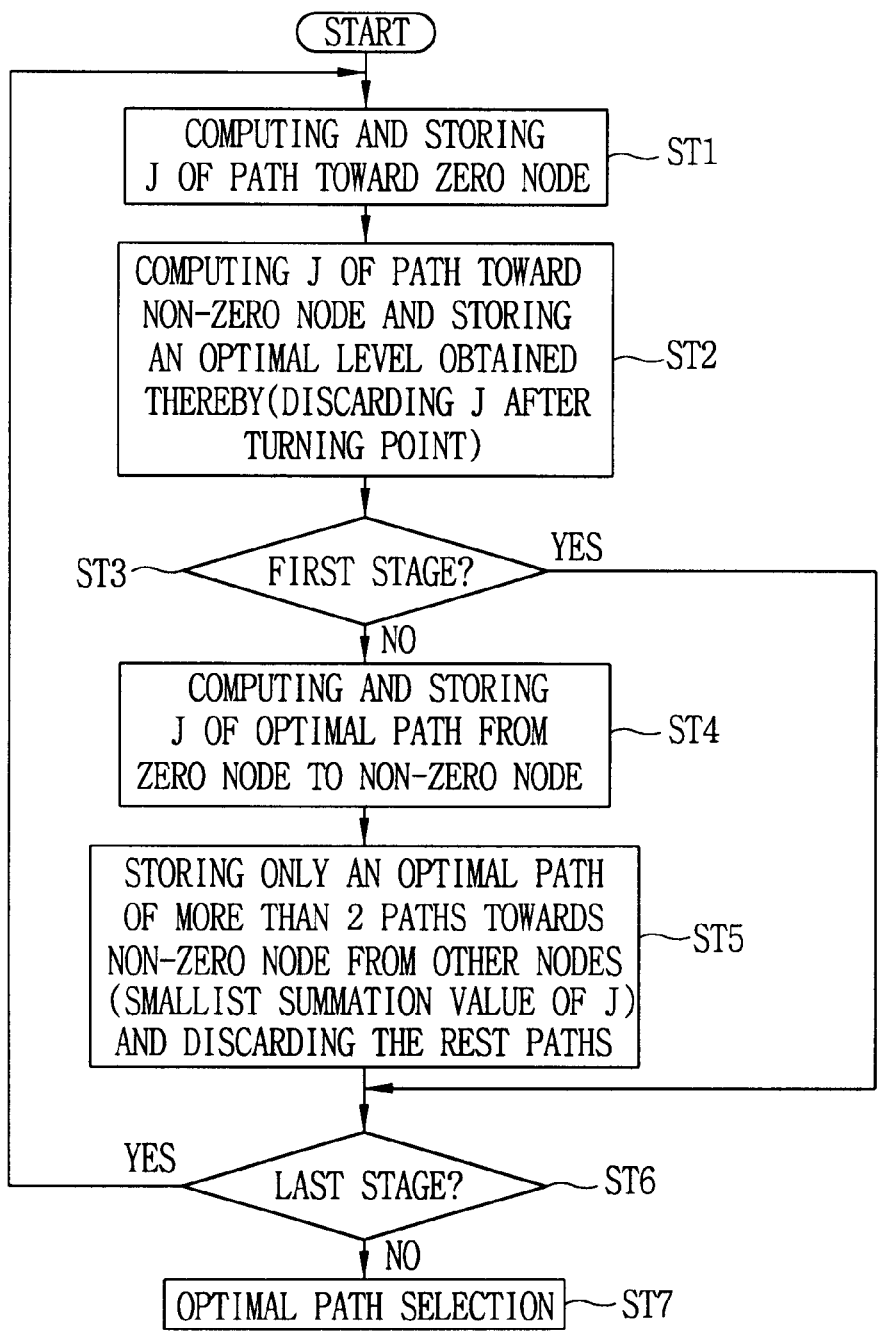
FIG. 7 is a flowchart showing a method for tracing the optimal path using a Trellis-based adaptive quantizer in accordance with the present invention.

FIG. 7 is a flow chart illustrating an optimal path tracing method at a Trellis-based adaptive quantizer according to the present invention which includes a step ST1 for computing a metric values J of the paths in the direction from a certain node to zero nodes and storing them into a certain memory, and a step ST2 for computing metric values of the paths from the node to non-zero nodes before turning point of the metric value and storing an optimal path (or level).

Next, in a step ST3, it is judged whether the zero nodes or non-zero nodes is in the first state. As a result of the judgement, if the same is judged not to be the first stage, the optimal metric values J's from the zero nodes to the non-zero nodes is computed and stored in a step ST4, and only an optimal path of more than two paths towards non-zero node from other nodes is stored and the remaining paths are discarded in a step ST5.

If the determination of the step ST3 is the first step or when executing the step ST5, it is judged whether the next stage is last in a step ST6. If the stage is not last, the steps is returned to the step St1, and the above-described operation is repeatedly performed with respect to the next stages, and if the same is the last stage, the optimal path is selected in a step ST7.

Therefore, the above-described operations are repeatedly performed, so that it is possible to decrease the computation amount of the coding of the data between the nodes for thereby generating an optimal path.

The procedure for determining the optimal path between two stages will be explained based on the optimal path tracing method using a Trellis-based adaptive quantizer according to the present invention.

First, the length of the code based on the run-level is defined as shown in Table 1.

TABLE 1

|  | Coding value | | | | | |
| --- | --- | --- | --- | --- | --- | --- |
|  | 0 | | | 1 | | EOB (End of Block) |
| Level(amplitude) | 1 | 2 | 3 | 1 | 2 | 3 | — |
| Code length(bit) | 2 | 3 | 3 | 6 | 7 | 9 | 7 |

As shown in the above table 1, "0" and "1" represent the coded values. The levels with respect to each code value are 1, 2, 3. The length of the code is defined the number of bits increased as the level is increased using a monotonic increase characteristics with respect to each level. The end of block (EOB) means the coding end of the data and is defined as has seven bits. The procedure for tracing the optimal path with respect to the two stages will be explained based on the above table with reference to FIG. 8.

Figure 8A:
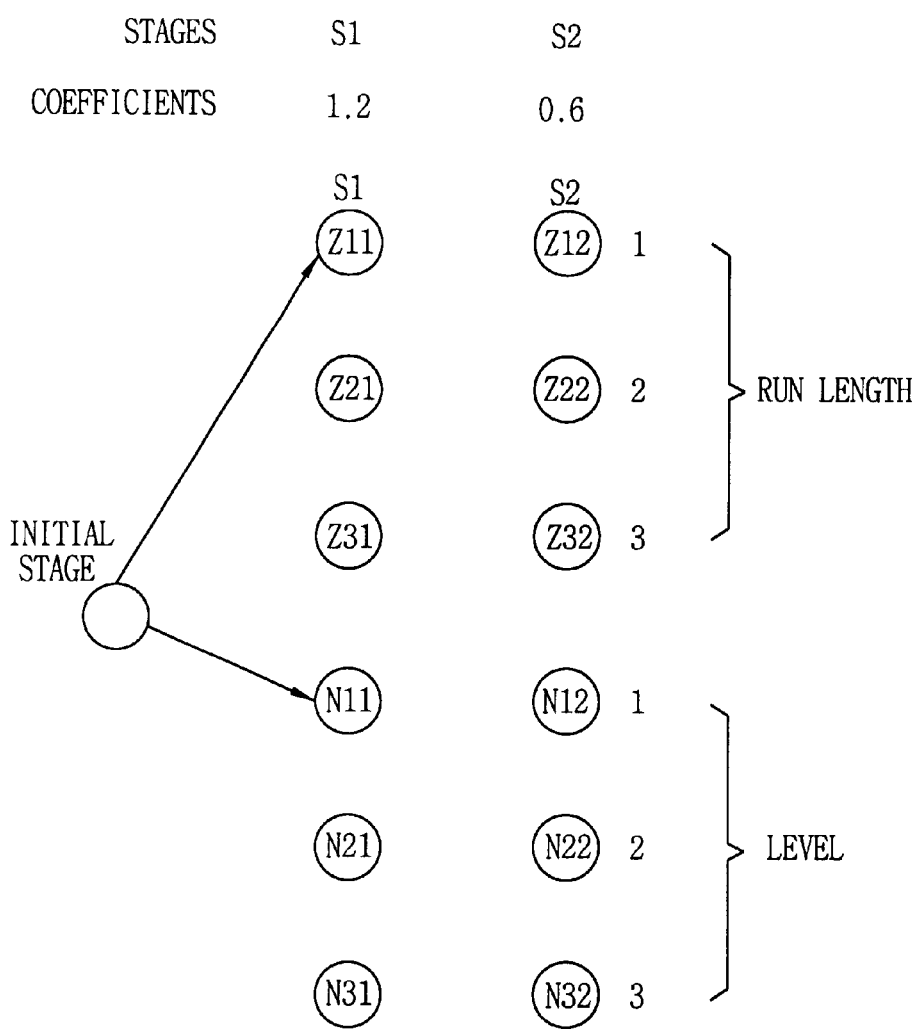
FIGS. 8A to 8D respectively illustrate the method for tracing the optimal path between two stages as a example of the present invention.

FIG. 8A illustrates the run and level with respect to two stages S1 and S2, and 1.2 and 0.6 represent quantizing coefficients with respect to the stages S1 and S2. When coding to "0", if the level of the coding value is 1, the nodes are Z11 and Z12. If the level of the coding value is 2, the nodes are Z21 and Z22. If the level of the coding value is 3, the nodes are Z31 and Z32. In addition, when coding to 1, if the level of coding coefficient is 1, the nodes are N11 and N12, and if the level of coding coefficient is 2, the nodes are N21 and N22. If the level of coding coefficient is 3, the nodes are N31 and N32.

Figure 8B:
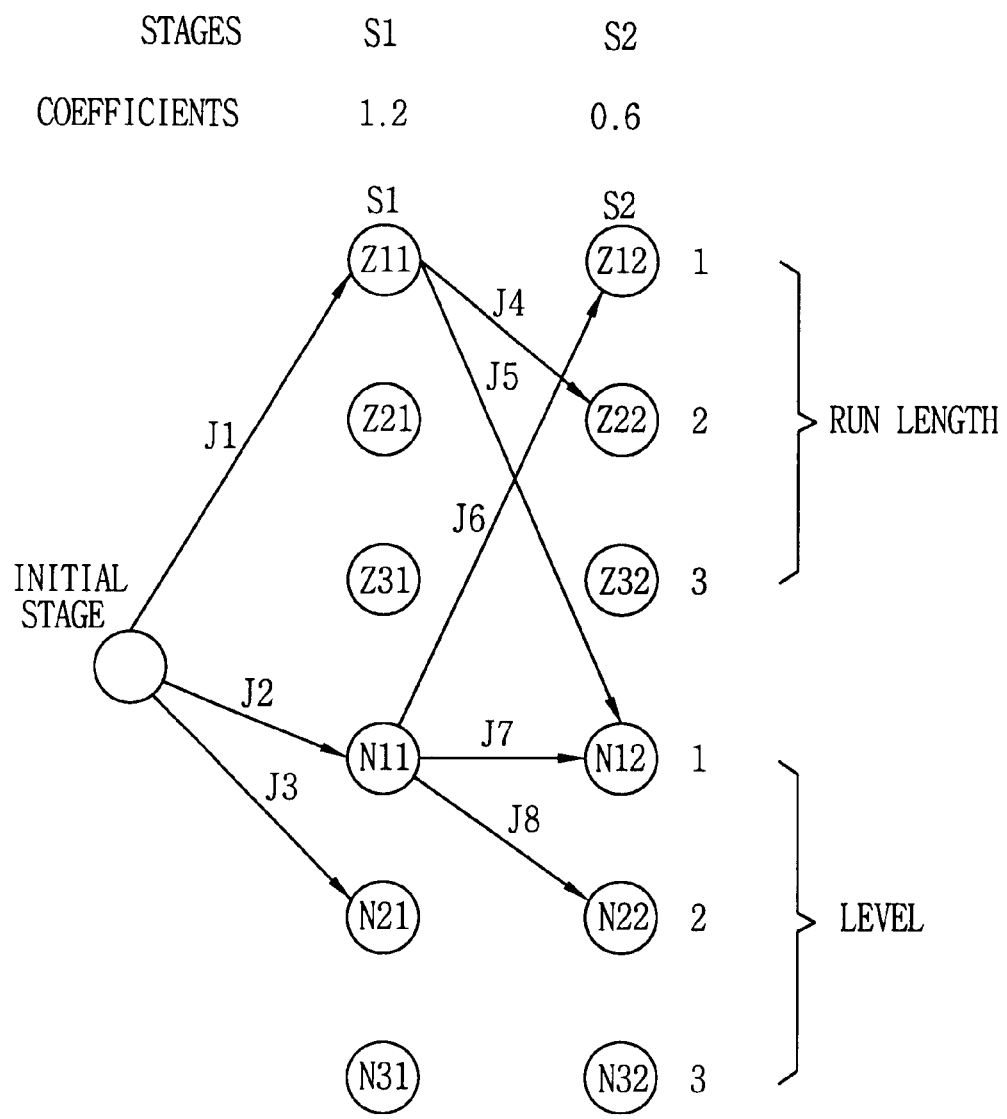

At this time, it is possible to assume that the path toward the node 1 at an initial stage is a branch toward Z11 coded to "0", and a branch toward N11 and N31 coded to "1". FIG. 8B illustrates a branch transited from the first stage S1 to the second stage S2. In the node Z11, there are the node Z22 coded to "0" and the branches toward the coded node N12. In addition, in the node N11, there are the node Z12 coded to "0" and the branches toward the coded nodes N12 and N22.

In order to compute the metric with respect to each path, each metric must be computed using the metric J, $J=D+\lambda \cdot R$ used for the Trellis quantizer, where R represents the length (bit) of the code, D represents a distortion, and $\lambda$ is a Lagrange constant and may be set as 1 for an easier computation. Therefore, the metric J is J=D+R, and the metric of each path is computed as follows.

$J1=D+R=(|0-1.2|)+R=1.2$ $J2=D+R=(|1-1.2|)+2=0.2+2=2.2$ $J3=D+R=(|1-1.2|)+3=0.2+3=3.2$ $J4=D+R=(|0-0.6|)+EOB+7=7.6$ $J5=D+R=(|1-0.6|)+6=0.4+6=6.4$ $J6=D+R=(|0-0.6|)+EOB=0.6+7=7.6$ $J7=D+R=(|1-0.6|)+2=0.4+2=2.4$ $J8=D+R=(|1-0.6|)+7=0.4+7=7.4$ where the distortion D is a difference between the coding value ("0" or "1") and the coefficients(1.2, 0.6).

Figure 8C:
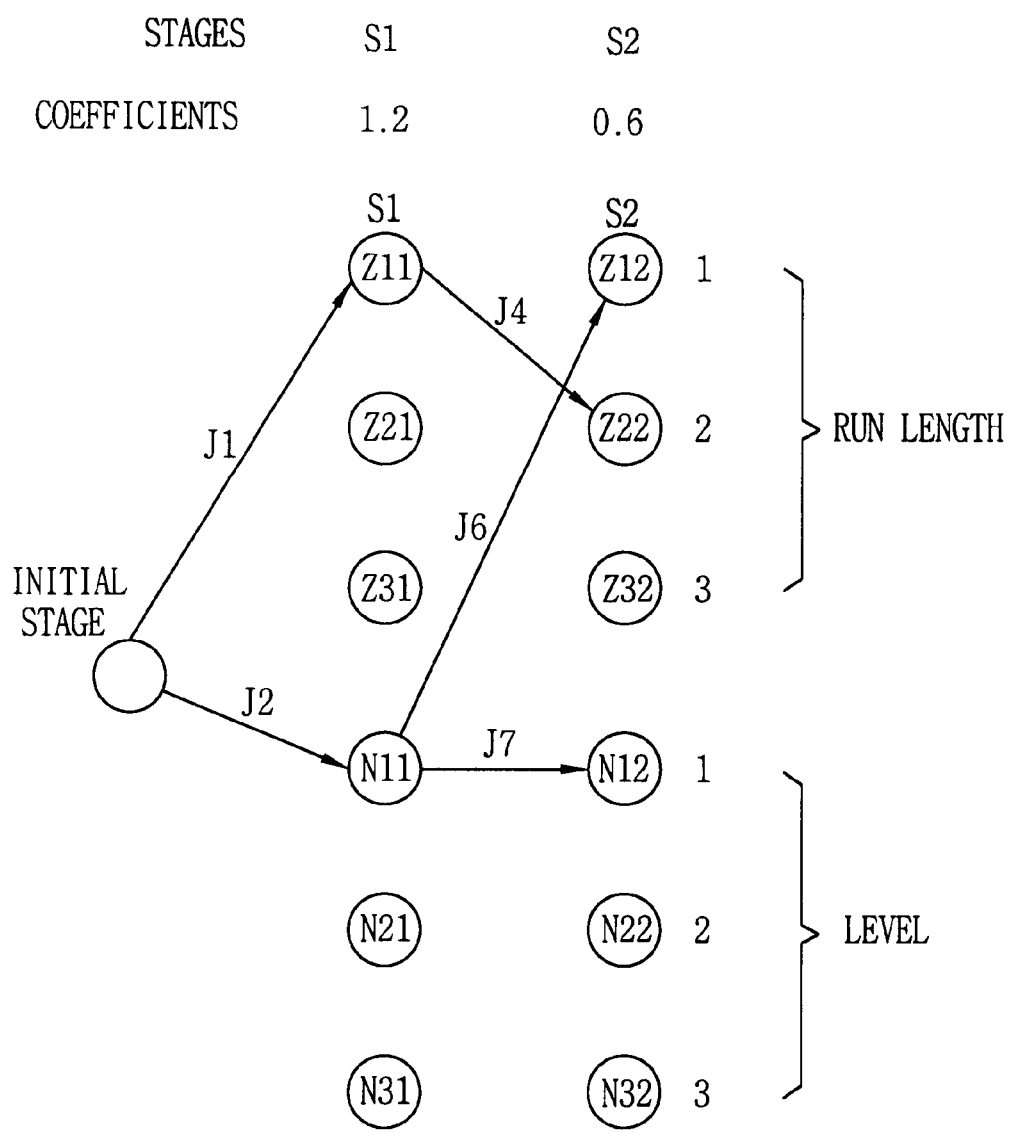

When using the computed metric, since the metric J3 is larger than J2, the metric toward N31 is not computed, and since J5 among the metric J5 and J7 at the branch in the direction of the node N12 of the non-zero is larger than J7, it is not needed to compute the metric toward the node below J7. In addition, the metric J8 among the metric J7 and J8 at the branch from the non-zero node N11 to the non-zero node N12 and the non-zero node N22 is larger than the metric J7, it is not needed to compute the metric with respect to the branch toward the node below the same. FIG. 8C illustrates the remaining paths as a result of the result.

Figure 8D:
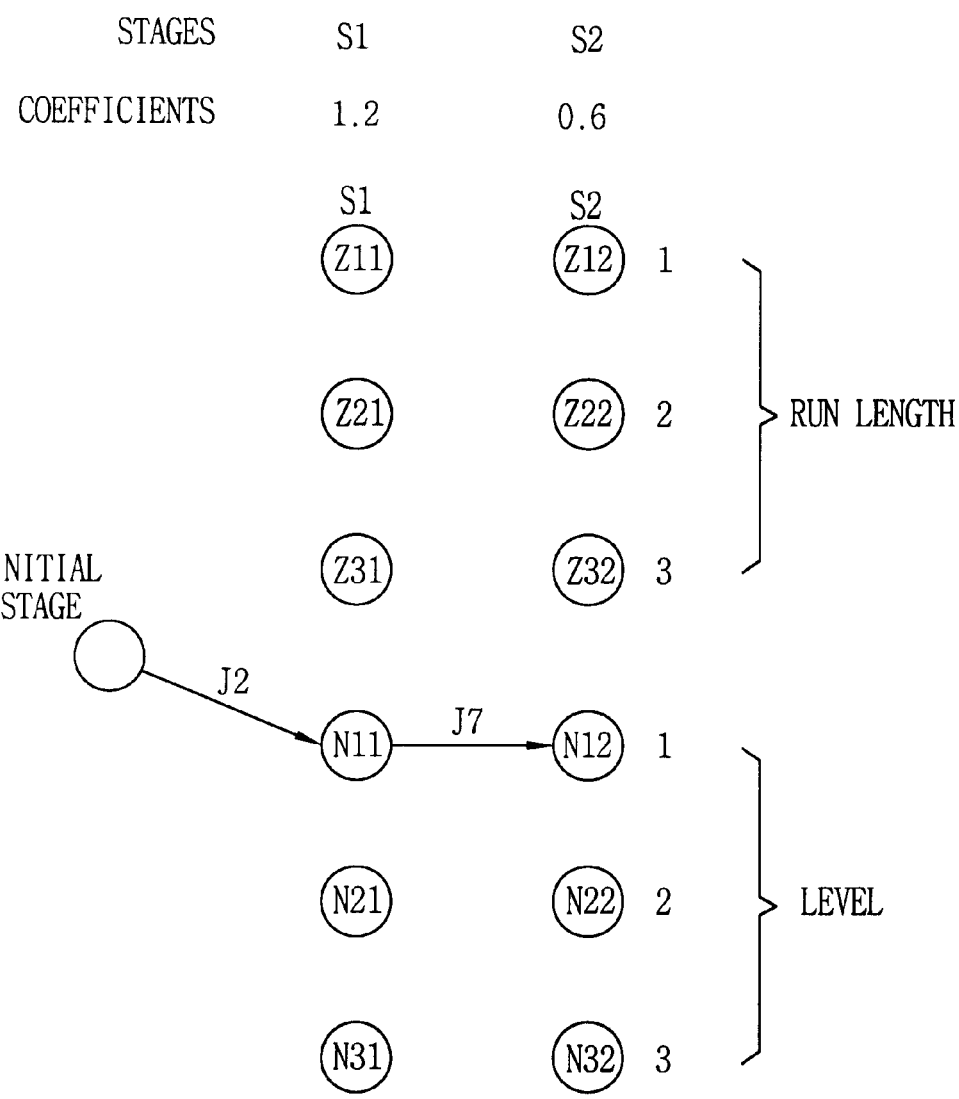

FIG. 8D illustrates an optimal path determined between the node 1 at the initial state and the second stage S2. When using the metric of the path with respect to each path generated from the node at an initial stage to the second stage, the metric having the minimum value is determined as an optimal path. Namely, the metric Jp1 of the first path p1 is 8,8 (Jp1=J1+J4=1.2+7.6=8.8), and the second path p2 is 7.6 (Jp2=J1+J5=1.2+6.4=7.6), and the third path p3 is 9.8 (Jp3=J2+J6=2.2+7.6=9.8), and the fourth path p4 is 4.6 (Jp4=J2+J7=2.2+2,4=4.6). Therefore, the optimal path is the fourth path.

Therefore, in the present invention, when performing the optimal quantization path trace, the path trace is not performed with respect to the branches after the variation point in which the distortion term D is decreased and then increased for thereby decreasing the computation amount. In addition, since the run and distortion are together increased with respect to the paths after the levels in which the optimal coding is performed at the branches from the zero to the non-zero, it is possible to remove the optimal quantization path trace and decrease the computation amount. In addition, it is possible to further decrease the computation amount of the quantization by adapting the present invention capable of removed on path among different paths gathered at the non-zero nodes.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. In a Trellis-based adaptive quantizer codes coefficient to which image blocks are transformed by transformation methods in a Trellis structure into a run-length code and entropy constrained code, a method for tracing an optimal path using the Trellis-based adaptive quantizer, comprising the steps of:

preventing quantization path tracing of branches after a turning point of distortion, on the basis of arrangement of a quantization interval and monotonic increasing characteristics of a code word length, in a Trellis structure that forms stages corresponding to quantized coefficients whenever the coefficients are quantized one by one from a node; and preventing path tracing after an optimal coding level to non-zero at the branches positioned from zero node to non-zero node, based on independence of the formed stages, when quantizing coefficients to non-zero node from the node.

2. The method according to claim 1, wherein the quantization interval is one-dimensional arrangement which increases the number of coding bit according to increasing a coding level.

3. The method according to claim 1, wherein the turning point is a point where the distortion values between nodes is decreased and then increased.

4. The method according to claim 1, wherein the independence of the stages means that metric values between stages are not affected by previous metric values of previous stages and does not affect future metric values of future stages.

5. The method according to claim 1, further comprising a step for selecting the optimal path and excluding the other paths, when two or more different paths are inputted into the non-zero node from nodes of previous stage.

6. The method according to claim 5, wherein the optimal path is determined by a minimum value of metric.

7. In a Trellis-based adaptive quantizer codes coefficients to which image blocks are transformed by transformation methods in a Trellis structure into a run-length code and entropy constrained code, a method for tracing an optimal path using the Trellis-based adaptive quantizer, comprising the steps of:

computing and storing metrics J's of branches which are directed into a first zero node group and a first non-zero node group from a node, respectively;

computing and storing a first optimal metric J of the branches which are directed into a second non-zero node from the first zero node group;

computing a second optimal metric J of the branches which are directed into the second non-zero node from the first non-zero node group.

8. The method according to claim 7, wherein the metrics of the branches directed into the first non-zero node group from the predetermined node are computed until a turning point where the metric value is decreased and then increased between two nodes.

9. The method according to claim 7, wherein the first and second optimal metrics have the smallest value summed all the metric values of every path into the second non-zero node from the previous nodes at the previous stages.

10. The method according to claim 7, wherein the first and second optimal metrics mean an optimal path.

11. The method according to claim 7, the metric J is determined as below equation:

$$J = D + \lambda \cdot R$$

where, R denotes the number of bits used for coding the coefficient, D denotes distortion between the coefficients of each stage and the coded coefficient, and $\lambda$ denotes a Lagrange constant.

* * * * *